United States Patent
Muehlbauer

(10) Patent No.: US 9,359,040 B2
(45) Date of Patent: Jun. 7, 2016

(54) ELECTRIC BIKE RETROFIT FOR DISC BRAKES BICYCLE

(71) Applicant: Securience, LLC, Wauwatosa, WI (US)

(72) Inventor: Don J. Muehlbauer, West Bend, WI (US)

(73) Assignee: Securience, LLC, Wawatosa, WI (US)

( * ) Notice: Subject to any disclaimer, the term of this patent is extended or adjusted under 35 U.S.C. 154(b) by 82 days.

(21) Appl. No.: 14/310,127

(22) Filed: Jun. 20, 2014

(65) Prior Publication Data

US 2015/0369316 A1    Dec. 24, 2015

(51) Int. Cl.
| F16D 55/08 | (2006.01) |
| B62L 3/00 | (2006.01) |
| F16D 65/12 | (2006.01) |
| F16D 65/02 | (2006.01) |

(52) U.S. Cl.
CPC ............ *B62L 3/00* (2013.01); *F16D 65/123* (2013.01); *F16D 2065/1332* (2013.01)

(58) Field of Classification Search
CPC ............ B62M 6/40; B62M 6/10; B62M 6/15; B62M 6/20; B62M 6/25; B62M 6/45; B62M 6/55; B62M 6/60; B62L 3/00; F16D 65/123; F16D 2065/1332
USPC ............ 188/72.1, 72.7, 72.8, 73.1, 156, 188/157–159, 162, 312; 280/274, 276, 279, 280/281.1
See application file for complete search history.

(56) References Cited

U.S. PATENT DOCUMENTS

| 5,890,980 | A | 4/1999 | Heyng | |
| 5,992,587 | A | 11/1999 | Maldonado | |
| 6,283,255 | B1 | 9/2001 | Gardner et al. | |
| 2002/0084134 | A1* | 7/2002 | Persson | B62M 6/10 180/312 |
| 2003/0111284 | A1* | 6/2003 | Chou | B62D 61/02 180/220 |
| 2013/0153321 | A1 | 6/2013 | Preining et al. | |
| 2015/0158550 | A1* | 6/2015 | Kawakami | B62M 6/45 180/206.2 |

FOREIGN PATENT DOCUMENTS

GB    2453039 A   *  3/2009

OTHER PUBLICATIONS http://www.instructables.com/id/48V-Electric-Flat-Tracker/?ALLSTEPS How-to guide to retrofit electric drive on a bicycle; Sep. 2, 2014.
http://www.ego-kits.com/en/drive-system/ Electric bike retrofit kit; Sep. 2, 2014.

* cited by examiner

*Primary Examiner* — Pamela Rodriguez
(74) *Attorney, Agent, or Firm* — Boyle Fredrickson, S.C.

(57) ABSTRACT

An apparatus and method for an electric bike retrofit for a disc brakes vehicle include an electric motor coupled with a rotor brake. The apparatus and method provide advantages in that the drive gear for the electric motor may be integrated with the brake rotor decreasing weight and minimizing necessary parts. The electric motor may mount to the existing brake caliper mounts and drive the brake rotor without the use of a chain, belt, or the like. Multiple gear ratios may be incorporated into the brake rotor allowing for shifting and increased efficiency of the electric drive system.

16 Claims, 4 Drawing Sheets

ELECTRIC BIKE RETROFIT FOR DISC BRAKES BICYCLE

BACKGROUND OF THE INVENTION

1. Field of the Invention

The present invention relates in general to the field of electrical assist of traditionally human powered vehicles, e.g., bicycles, scooters, etc. More particularly, the present invention relates to bicycles equipped with a braking system that utilizes brake rotors and calipers. Specifically, the present invention relates to retrofitting electric assist to pedal-powered bicycles that use brake rotors and calipers.

2. Discussion of the Related Art

Riding bicycles is a popular pastime for physical exercise as well as a means of transportation. In an effort to promote the utilitarian benefits of bicycle riding, electric bicycles have become popular in recent times. Electric bicycles allow individuals to use the same bicycle to get physical exercise as well as a means of transportation while avoiding exhaustion. This may be done by allowing the operator to pedal as the sole means of propulsion, use an electric drive as the sole means of propulsion, or use the electric drive to assist the pedaling efforts of the operator. Electric bicycles supplement the riders pedaling motion to minimize fatigue, increase the distance the operator can travel, and provide a more relaxing means of transportation.

One drawback to electric bicycles is that they are considerably expensive. When the bicycle is designed from the ground up to incorporate electronic controls, an electric, motor, a battery pack, and the necessary hardware, it imposes a significant financial burden that many consumers are not willing to absorb. As a result, retrofitting existing bicycles with electric drives has become popular.

When retrofitting a bicycle with an electric drive, there are a number of possible locations to mount the electric equipment on the bicycle. One problem is that there is limited space available on a bicycle frame to accommodate the electric drive equipment. It is therefore desirable to minimize the components needed as well as minimize the required space needed for the electric drive. It is also desirable to improve existing electric bicycle retrofit packages by utilizing existing components of the pedal drive.

Another drawback to existing electric drive retrofits is that they utilize their own components to transfer the assisted power from the electric motor to the bicycle. For example, one popular retrofit uses a completely new rear wheel with an electric motor incorporated into the central hub of the wheel. This solution is typically very expensive and wheel damage is harder to repair as it is not a common "off the shelf" item. Other common electric retrofits add an electric motor to the bicycle frame and transfer power with a series of belts and/or chains. The added gear may be added directly to the crank or to the gears on the rear wheel. An added chain or belt is then used, providing additional weight, complexity, and maintenance to the bicycle.

What is therefore needed is an electric bicycle retrofit that utilizes existing components of the bicycle. What is also needed is a way to transfer the electric assist power to the bicycle without additional chains or gears. What is also needed is an improved electric retrofit that utilizes less space on the bicycle frame.

SUMMARY AND OBJECTS OF THE INVENTION

A pedal-powered bicycle frame may be retrofitted with an electric assist that attaches to the frame of the bicycle. More specifically, the electric assist may attach to the brake system of the bicycle. The brake system may include a device for attaching the brake system to the frame, a brake rotor with rotor gear teeth rotatably attached to the flame, and a brake caliper configured to selectively engage the rotor. In order to provide rotational force to the wheels of the bicycle, an electric motor may be attached to the device and also configured to engage the brake rotor gear teeth thus providing rotational force to the brake rotor and propelling the bicycle.

The electric retrofit assembly, including the electric motor and brake rotor, may be configured to retrofit onto the bicycle frame without modification of the brake caliper, frame, or the wheels attached to the frame.

In one embodiment, the brake rotor gear teeth may extend from the outer circumference of the brake rotor and selectively engage and disengage with a motor gear attached to the electric motor. In another embodiment, the brake rotor gear teeth may be between the outer circumference and a center point of the brake rotor. In this embodiment, each gear tooth consists of a hole in the side of the brake rotor. A plurality of holes, or gear teeth, may form multiple circumferential rings in the face of the brake rotor, each circumferential ring having a distinct diameter which produces a distinct gear ratio for each circumferential ring.

In the embodiment where the brake rotor includes circumferential rings, a shifting device may be configured to selectively engage and disengage the motor gear with each one of the circumferential rings while the bicycle is in motion and the brake rotor is turning. The motor gear may include an angle gear configured to engage the plurality of circumferential rings at a 90-degree angle to a face of the brake rotor.

In any embodiment, the electric motor may also provide braking by utilizing electrical regenerative braking, wherein the motor converts kinetic energy into electrical energy. Also in any embodiment, the electric motor may attach to the attachment device of the brake caliper, or may attach to the rear dropout, or axle, portion of the rear wheel of the bicycle. Regardless of the attachment point, the bicycle frame, wheels, and brake caliper do not require modification.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
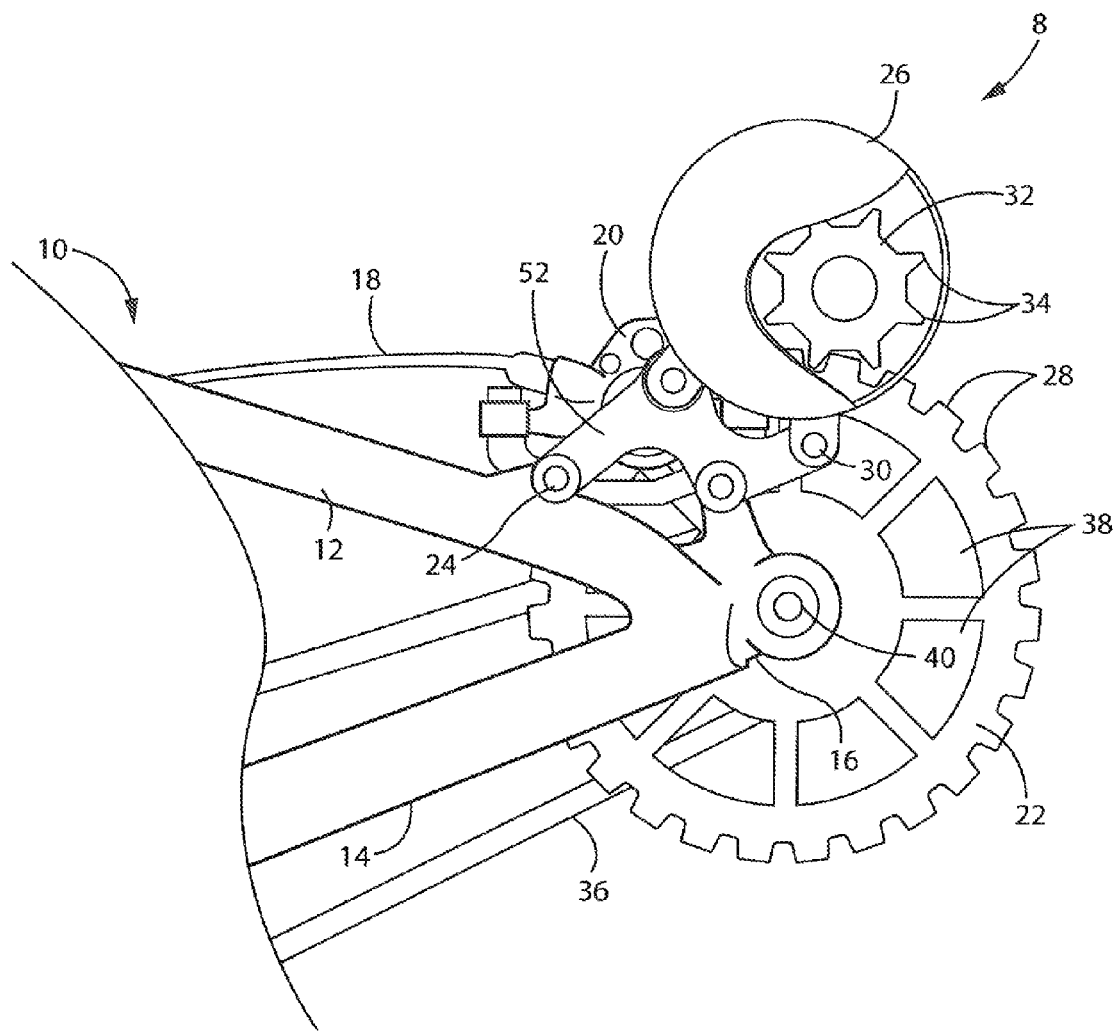
FIG. 1 illustrates a side view of an electric motor and brake rotor drive gear attached to a bicycle frame according to one embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF EMBODIMENTS

The present invention and the various features and advantageous details thereof are explained more fully with reference to the non-limiting embodiments described in detail in the following description. While the invention is directed toward use with bicycles, it is not limited to just traditional bicycles. The term "bicycle" is used to include any multi-wheeled form of transportation which may or may not include a seat. For example, scooters that support a rider in an upright, standing position are also included in the term "bicycle". The "bicycle" may be chain driven, belt driven, pulley driven, gear driven, or any other form of rotational motion delivery.

An electric drive 8 retrofit is shown in FIG. 1 attached to a frame 10 of a bicycle. Bicycle frames 10 commonly include a seat stay tube 12 and a chain stay tube 14 that converge at a rear wheel dropout 16. The electric drive may also attach to any other bicycle regardless of the frame design. While it is preferred that the electric drive 8 be utilized on a frame 10 equipped with disc brakes, the electric drive 8 may be used on any wheeled vehicle. The electric drive 8 may also be used as a braking device through regenerative braking, where the kinetic energy of the rotating rotor 22 is converted into potential energy, or electricity, for storage in a battery pack on board the frame 10.

The electric drive 8 consists of an electric motor 26 that powers a motor gear 32. The motor gear 32 includes a plurality of motor gear teeth 34 that extend from the outer diameter of the motor gear 32 forming a spur gear. While a spur gear is shown, any other type of gear may be used such as internal ring gears, helical gears, face gears, worm gears, or the like.

Figure 1A:
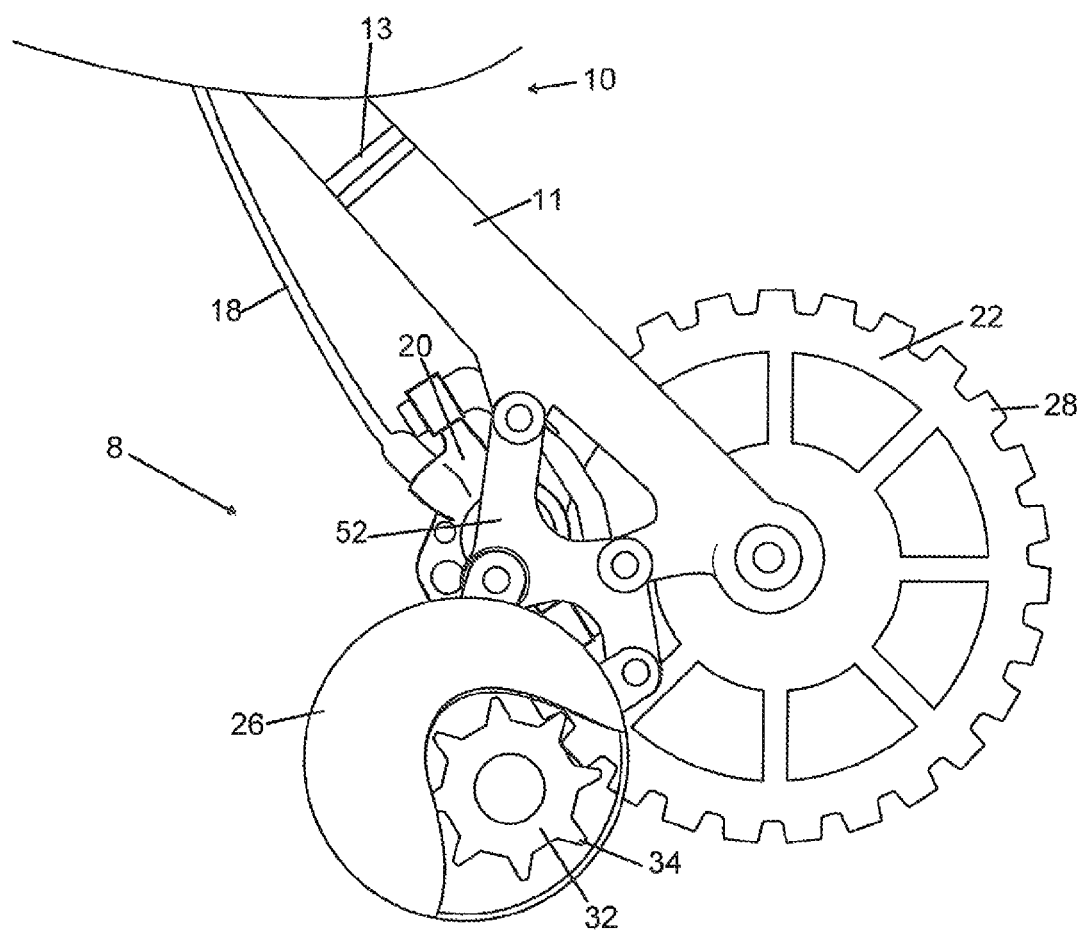
FIG. 1A illustrates a side view of an electric motor and brake rotor drive gear attached to the front fork of a bicycle frame according to another embodiment of the invention.

In order to provide the frame 10 with forward momentum, the gear teeth 34 mesh with a mating gear incorporated in the brake rotor 22. The brake rotor 22 may include rotor vents 38 which serve to cool the rotor 22 as well as lighten it. The brake rotor 22 may also be solid without vents 38. Preferably, the rotor 22 mounts to the frame 10 about the rear wheel dropout 16 without any kind of modification to the rear wheel dropout 16, the center axle 40, the caliper 20, bicycle drive chain 36, or any other component of the bicycle. The electric drive 8 may also be attached to the frame 10 on the front fork 11 or front wheel portion of the bicycle in any of the mentioned embodiments. For example, FIG. 1A shows the electric drive 8 attached to the front fork 11 using a motor bracket 52, similar to FIG. 1. Any of the embodiments shown in FIGS. 2 and 3 may also be similarly located on the front fork 11. All other components of the electric drive 8 remain the same, but locating the electric drive 8 on the front fork 11 improves bicycle performance when a suspension 13 is used. In bicycles with a suspension 13, such as a shock absorber and/or spring, in the front portion, the un-sprung weight of the bicycle is reduced. Contrary to the rear wheel portion of the bicycle, the rear wheel dropout 16 is not commonly sprung when a suspension is used. However, the front fork 11 portion where the brake rotor 22 is located is often sprung with a suspension 13. By locating the electric drive 8 on the front fork 11, the un-sprung weight is reduced and the performance of the suspension 13 is increased.

By utilizing the rotor 22 as the drive gear for the electric drive 8, the typical necessity of adding an additional gear, chain, belt, pulley, or any other device for an electrical, assist retrofit is eliminated. Also, the bicycle chain drive 36 and related gears are not tampered with.

In previous electric bicycle retrofits installation required a bicycle expert to disassemble the rear wheel and chain drive 36 from the frame 10. By using the brake rotor 22 as the drive gear for the electric motor 26, installation is simplified. The caliper 20 and brake line 18 may also remain in their original location. As a result, the electric drive 8 reduces the weight, cost, complexity, and installation difficulty of known electric drives.

For bicycles originally equipped with brake rotors, the rotor 22 may be furnished as a direct retrofit and not require any adjustment to the caliper 20. For bicycles that do not have brake rotors, a conventional "disc brake" retrofit kit may be used that implements the rotor 22 with rotor gear teeth 28. Additionally, the motor 26 may include a mounting attachment such as the motor mount eyes 30 or any other suitable fastening means. The motor 26 may either attach directly to the frame 10 by affixing to the caliper mount eyes 24 or with a motor bracket 52 to give the motor 26 the proper offset and clearance, thus allowing the motor gear 32 to mesh with the rotor 22. On bicycles that use threaded bosses for caliper attachment, a similar motor bracket 52 may be used or the motor 26 may be designed with a housing allowing attachment without a motor bracket 52.

While FIG. 1 shows the caliper 20 attached to the seat stay tube 12 of the frame 10, the caliper 20 may also attach to the chain stay tube 14 with or without a motor bracket 52. According to FIG. 2, the electric motor 26 may also attached to the rear wheel dropout 16 with a fastener attached to the center axle 40 or other existing fastener.

Figure 2:
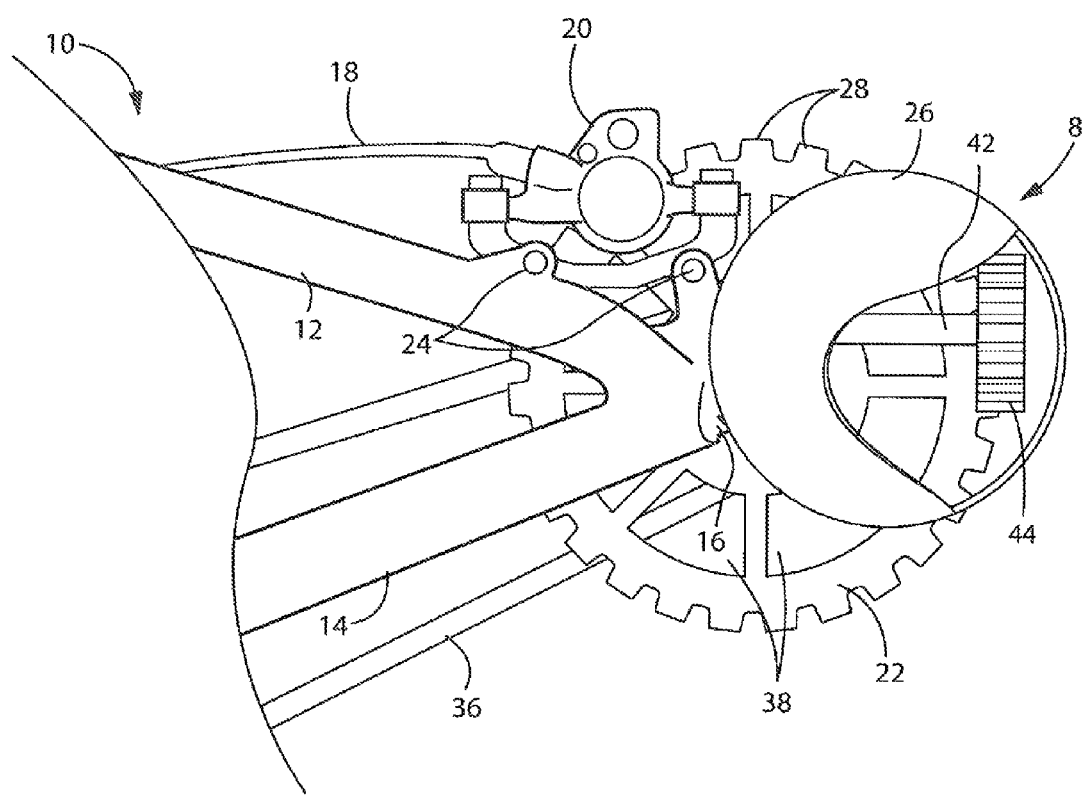
FIG. 2 illustrates a side view of an electric motor and brake rotor drive gear attached to a frame of a bicycle according to another embodiment of the invention.

When mounting the motor 26 to the rear wheel dropout 16, a different type of gear on the motor 26 may be used. As shown in FIG. 2, the same rotor 22 may be used with rotor teeth 28 on the outer circumference of the rotor 22. The motor 26 may include an angle gear 44 that meshes with the rotor gear teeth 28 at approximately a 90-degree angle. The angle gear 44 may extend from the motor 26 with a shaft 42 to provide optimal clearance or may be directly attached to the motor 26 without an extended shaft 42. In this embodiment, the caliper 20 and caliper mount eyes are not used to retain the motor 26. As a result, the motor bracket 52 shown in FIG. 1 may be eliminated.

Figure 3:
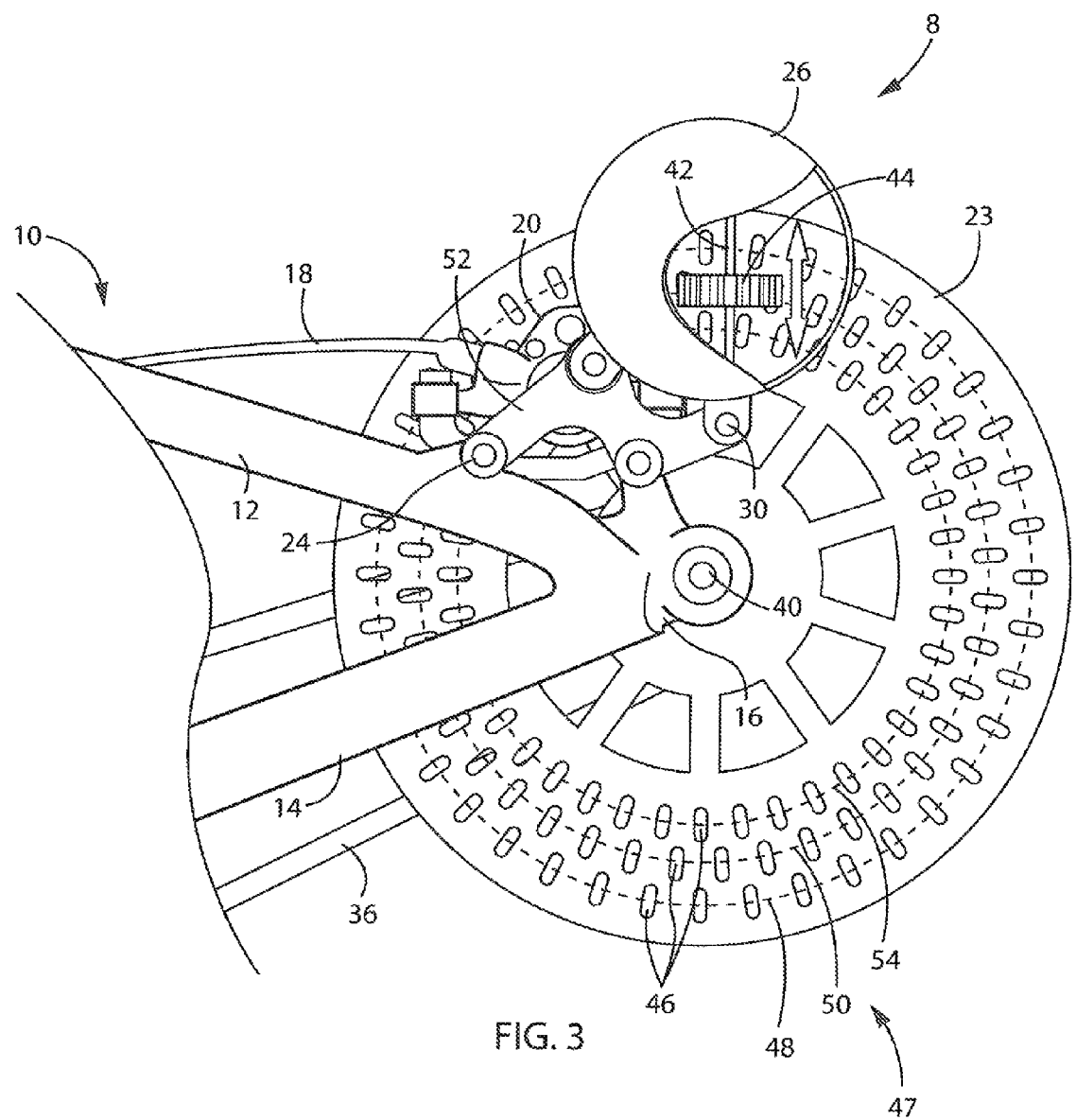
FIG. 3 illustrates a side view of an electric motor and brake rotor drive gear attached to a frame of a bicycle according to yet another embodiment of the invention.

Transitioning now to FIG. 3, an alternative embodiment is shown wherein an alternative rotor 23 is used that does not include teeth on the outer circumference of the rotor 23. The rotor 23 instead has a series of gear teeth circumferences 47 formed with concentric rings of holes 46 formed in the face of the rotor 23. Each gear teeth circumference 47 forms an independent gear in the rotor 23. The holes 46 allow for teeth on the angle gear 44 to insert into the holes 46. As the motor 26 rotates the angle gear 44, the rotor may be rotated thus providing forward momentum to the frame 10 of the bicycle.

The plurality of gear teeth circumferences forms a first gear teeth circumference 48, a second gear teeth circumference 50, and a third gear teeth circumference 54. Each gear circumference has a unique circumference, which means each gear teeth circumference 47 also has a different amount of holes 46. As a result, the larger the gear teeth circumference, the taller the gear ratio. Similarly, the smaller the gear teeth circumference, the shorter the ratio.

The motor 26 may include a movable angle gear 44 which may move along the face of the rotor 23 along the shaft 42 or with any other suitable positioning device. In this configuration, multiple gear ratios may be attained allowing an operator to shift the angle gear 44 along a path and mesh with each gear teeth circumference 47 while the bicycle is in motion. As a result, the electric power stored onboard the frame 10 (not shown), may be conserved and utilized more efficiently by shifting the angle gear to a desired gear ratio for different inclines, terrains, or level of electrical assistance. The shifting may be used in combination with electronic controls (not shown) that can automate the shifting resulting in an automatic transmission, or the user may be able to selectively engage each gear teeth circumference 47. Shifting may also be accomplished with mechanical means such as cables, linkages, or the like. The motor 26 may also mount to the rear wheel dropout 16 as shown in FIG. 2 and utilize the rotor 23 with holes 46 and a shifting mechanism.

While the motor gear 32 is shown as a traditional spur gear that transfers rotational force from the motor 26 to the brake rotor 22, the motor gear 32 may also perform the function of the caliper 20. In such an embodiment, the motor gear 32 would include a split perpendicular to the gear teeth 32 dividing the motor gear 32 in half. A small spacing may be included between each motor gear 32 half with the rotor gear teeth 22 and a portion of the rotor 22 between the motor gear 32 halves. As the motor gear 32 is turned by the motor 26, a portion of the motor gear 32 may engage the rotor gear teeth 28 to drive the brake rotor 22. For example, the central axis of the motor gear 32 may include motor gear teeth 34. When the operator engages the brakes via brake line 18 or other engagement means, each half of the motor gear 32 may "pinch" or clamp onto the rotor 22 which brings the rotation of the rotor 22 to a stop.

In a slightly different embodiment, the motor gear 32 is not split in half as mentioned above but may have a frictional device on each side of the motor gear 32 which acts just like pistons in a caliper slow the rotor's rotation.

In yet another embodiment, the motor gear 32 may be eliminated and replaced with drive wheels that engage each face of the rotor 22 with a frictional material exerting a clamping force of the rotor 22. Each wheel may be rotated by the motor 26 to deliver rotational force. As a result, the brake rotor gear teeth 28 and caliper 20 may be eliminated. In order to provide braking, the motor 26 may be switched to a generator and provide regenerative braking power. The rotational force of the rotor 22 may be converted into electrical energy by the motor 26 which may then be stored in a storage device such as a battery. Also, the wheel may simply "lock-up" or provide added friction to the face of the rotor 22 in order to slow the rotation of the rotor 22.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept. It is intended that the appended claims cover all such additions, modifications, and rearrangements.

Expedient embodiments of the present invention are differentiated by the appended claims.

What is claimed is:

1. An electric assist retrofit for a bicycle frame comprising:
   a brake system comprising:
   a) a device for attaching the brake system to the frame;
   b) a brake rotor with rotor gear teeth rotatably attached to the frame; and
   c) a brake caliper configured to selectively engage the brake rotor;
   an electric motor attached to the device configured to engage the brake rotor gear teeth and provide rotational force to the brake rotor;
   wherein the rotor gear teeth are between outer circumference and a center point of the brake rotor;
   a plurality of holes, each hole forming a brake rotor and gear tooth, wherein the plurality of holes form multiple circumferential rings in the brake rotor and wherein each circumferential ring includes a distinct diameter.

2. The electric assist retrofit for a bicycle frame of claim 1, wherein the electric motor and brake rotor are configured to retrofit onto the frame without modification of the brake caliper, frame, and a plurality of wheels attached to the frame.

3. The electric assist retrofit for a bicycle frame of claim 1, further comprising an outer circumference on the brake rotor and wherein the brake rotor gear teeth extend from the outer circumference of the brake rotor.

4. The electric assist retrofit for a bicycle frame of claim 1, further comprising a motor gear configured to selectively engage and disengage the brake rotor gear teeth.

5. The electric assist retrofit for a bicycle frame of claim 1, further comprising a shifting device configured to selectively engage and disengage a motor gear with each one of the circumferential rings.

6. The electric assist retrofit for a bicycle frame of claim 1, further comprising:
   a motor gear configured to selectively engage and disengage the brake rotor gear teeth.

7. The electric assist retrofit for a bicycle frame of claim 6, wherein the motor includes an angle gear configured to engage the plurality of circumferential rings at a 90-degree angle to a face of the brake rotor.

8. The electric assist retrofit for a bicycle frame of claim 7, wherein the angle gear can selectively move to engage each one of circumferential rings and selectively move to disengage each one of the circumferential rings while the brake rotor is rotating.

9. The electric assist retrofit for a bicycle frame of claim 1, further comprising electrical regenerative braking, and wherein the motor converts kinetic energy into electrical energy.

10. An electric assist retrofit for a bicycle frame comprising:
    a brake rotor with an outer circumference rotatably attached to the frame;
    a plurality of brake rotor gear teeth extending from the brake rotor;
    an electric motor attached to one of a rear wheel dropout and a front fork of the frame;
    an electric motor gear attached to the electric motor and configured to engage the brake rotor gear teeth and selectively provide rotational force to the rotor;
    a plurality of holes, each hole forming a brake rotor gear tooth,
    the electric motor gear configured to selectively engage and disengage the brake rotor gear teeth; and a plurality of circumferential rings formed by the plurality of holes in the brake rotor, and wherein each circumferential ring includes a distinct diameter.

11. The electric assist retrofit for a bicycle frame of claim 10, wherein the brake rotor gear teeth extend from the outer circumference of the brake rotor.

12. The electric assist retrofit for a bicycle frame of claim 10, further comprising:
an angle gear configured extending from the motor and configured to engage the plurality of circumferential rings at a 90-degree angle to a face of the brake rotor; and wherein
the angle gear can selectively move to engage each one of the circumferential rings and selectively move to disengage each one of the circumferential rings while the brake rotor is rotating.

13. The electric assist retrofit for a bicycle frame of claim 12, wherein the angle gear can selectively move to engage each one of circumferential rings and selectively move to disengage each one of the circumferential rings while the brake rotor is rotating providing a rotational force to the brake rotor at a plurality of gear ratios.

14. An electric assist retrofit for a vehicle comprising:
a brake rotor with an outer circumference rotatably attached to the vehicle;
a plurality of brake rotor gear teeth in the brake rotor;
a plurality of gears formed by the brake rotor gear teeth;
an electric motor attached to the vehicle;
an electric motor gear attached to the electric motor and configured to engage the brake rotor gear teeth and selectively provide rotational force to the rotor; and
a shifting device configured to selectively engage and disengage the motor gear with each one of the gears.

15. The electric assist retrofit for a vehicle of claim 14, further comprising a plurality of circumferential rings formed by the brake rotor gear teeth in the brake rotor, and wherein each one of the circumferential rings form one of the plurality of gears.

16. The electric assist retrofit for a vehicle of claim 14, wherein the electric motor is attached to the vehicle by one of a rear wheel drop out and a device for attaching the brake system to the vehicle.

* * * * *